US011247180B2

(12) United States Patent
Bos et al.

(10) Patent No.: US 11,247,180 B2
(45) Date of Patent: Feb. 15, 2022

(54) METHOD, SPINNERET AND SYSTEM FOR FABRICATING MULTILAYER MEMBRANES

(71) Applicant: DUPONT SAFETY & CONSTRUCTION, INC., Wilmington, DE (US)

(72) Inventors: Menno Bos, Greifenberg (DE); Martin Heijnen, Greifenberg (DE); Natalia Widjojo, Singapore (SG)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 628 days.

(21) Appl. No.: 16/086,941

(22) PCT Filed: Mar. 20, 2017

(86) PCT No.: PCT/EP2017/056500
§ 371 (c)(1),
(2) Date: Sep. 20, 2018

(87) PCT Pub. No.: WO2017/162554
PCT Pub. Date: Sep. 28, 2017

(65) Prior Publication Data
US 2019/0099724 A1    Apr. 4, 2019

(30) Foreign Application Priority Data

Mar. 21, 2016 (EP) ..................... 16161384

(51) Int. Cl.
*B01D 69/08* (2006.01)
*B01D 69/02* (2006.01)
(Continued)

(52) U.S. Cl.
CPC ........... *B01D 69/085* (2013.01); *B01D 69/02* (2013.01); *B01D 69/082* (2013.01);
(Continued)

(58) Field of Classification Search
CPC ...... B01D 69/08–088; D01D 5/24; D01F 1/08
See application file for complete search history.

(56) References Cited

U.S. PATENT DOCUMENTS

| 4,713,292 A | 12/1987 | Takemura et al. |
| 4,802,942 A | 2/1989 | Takemura et al. |

(Continued)

FOREIGN PATENT DOCUMENTS

| CN | 1408466 A | 4/2003 |
| CN | 103015082 A | 4/2013 |

(Continued)

OTHER PUBLICATIONS

International Search Report dated May 31, 2017, in PCT/EP2017/056500, filed Mar. 30, 2017.

(Continued)

*Primary Examiner* — Alex A Rolland
(74) *Attorney, Agent, or Firm* — Kenneth Crimaldi

(57) ABSTRACT

The present invention is related to a method for fabricating multilayer singlebore membranes (10) or multilayer multibore membranes (20) for ultrafiltration applications including the following method steps: (a) feeding at least a material of a substrate (12), at least one material of a functional layer (14, 15) and a bore fluid (36) to a spinneret (30) simultaneously; (b) forming said membranes (10, 20) as a tube-like string (54) in a one-step process in said spinneret (30); (c) thereby assigning a functionality to said functional layer (14, 15) applied on at least one surface (13, 17) of said substrate (12). The invention is also related to a spinneret (30) for fabricating multilayer singlebore membranes (10) or multilayer multibore membranes (20), using the inventive method, and to a system comprising such a spinneret (30).

4 Claims, 6 Drawing Sheets

(51) Int. Cl.
*B01D 69/12* (2006.01)
*B01D 71/68* (2006.01)
*B01D 61/14* (2006.01)

(52) U.S. Cl.
CPC ......... *B01D 69/087* (2013.01); *B01D 69/088* (2013.01); *B01D 69/12* (2013.01); *B01D 71/68* (2013.01); *B01D 61/145* (2013.01); *B01D 2323/02* (2013.01); *B01D 2323/42* (2013.01); *B01D 2325/02* (2013.01); *B01D 2325/28* (2013.01); *B01D 2325/36* (2013.01); *B01D 2325/48* (2013.01)

(56) References Cited

U.S. PATENT DOCUMENTS

| | | | |
|---|---|---|---|
| 4,970,034 | A | 11/1990 | Ly et al. |
| 5,096,585 | A * | 3/1992 | Nguyen ............. B01D 67/0009 |
| | | | 210/500.23 |
| 5,141,642 | A | 8/1992 | Kusuki et al. |
| 5,620,790 | A | 4/1997 | Holzki et al. |
| 2009/0305871 | A1 | 12/2009 | Perera et al. |
| 2011/0266223 | A1 | 11/2011 | Yang et al. |
| 2013/0206673 | A1 | 8/2013 | Ying et al. |
| 2013/0256214 | A1 * | 10/2013 | Dahlberg ............. B01D 69/082 |
| | | | 210/500.22 |
| 2013/0338297 | A1 | 12/2013 | Ford et al. |
| 2016/0288056 | A1 | 10/2016 | Bergmann et al. |

FOREIGN PATENT DOCUMENTS

| | | |
|---|---|---|
| CN | 103501878 A | 1/2014 |
| CN | 204385338 U | 6/2015 |
| EP | 0 362 588 A1 | 4/1990 |
| EP | 1298740 A2 | 4/2003 |
| JP | 62-19205 A | 1/1987 |
| JP | 2-251232 A | 10/1990 |
| KR | 20150137194 A | 12/2015 |
| WO | WO 01/89673 A2 | 11/2001 |
| WO | WO 03/097221 A1 | 11/2003 |
| WO | WO 2007/007051 A1 | 1/2007 |
| WO | WO 2015/075178 A1 | 5/2015 |

OTHER PUBLICATIONS

Clodt, J.I. et al., "Performance study of isoporous membranes with tailored pore sizes", Journal of Membrane Science, vol. 495, XP 055374355, Dec. 1, 2015, pp. 334-340.

* cited by examiner

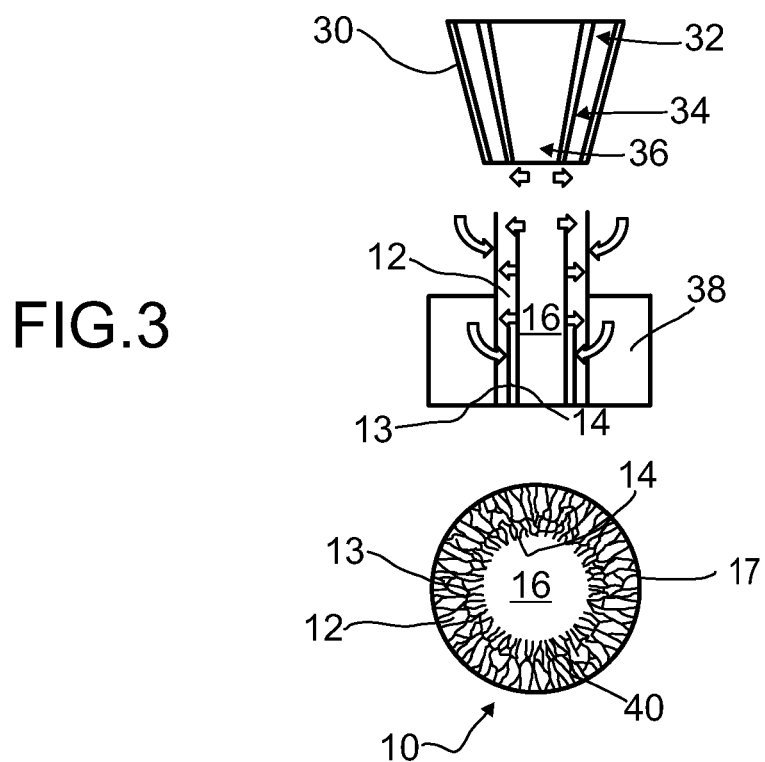

METHOD, SPINNERET AND SYSTEM FOR FABRICATING MULTILAYER MEMBRANES

DESCRIPTION

Technical field

The present invention relates to a method, a spinneret and a system for fabricating multilayer singlebore membranes or multilayer multibore membranes for ultrafiltration applications, in particular for water treatment applications.

Prior Art

U.S. Pat. No. 5,141,642 is related to aromatic polyimide double-layered hollow filamentary membranes and a process for producing the same. A hollow filamentary microporous inner layer consists essentially of a first aromatic imide polymer soluble inorganic solvent provided with a filamentary hollow formed along the longitudinal axis thereof and having a thickness of 10 µm to 500 µm. Further, a tubular filamentary asymmetric outer layer consists essentially of a second aromatic imide polymer soluble in organic solvents and having a tubular filamentary microporous intermediate layer covering and united to the outside surface of the hollow filamentary microporous inner layer and having a thickness of 2 µm to 200 µm and a dense outside surface layer covering and united with a tubular filamentary microporous intermediate layer having a thickness of no more than 1 µm.

According to U.S. Pat. No. 5,141,642 a process is disclosed for producing an aromatic polyimide double hollow filamentary membrane comprising the following steps:

(1) feeding a first spinning dope solution of a first aromatic imide polymer soluble in organic solvents in a concentration of 5% to 35% by weight in an organic solvent to an inner annular extruding opening of a hollow filament-spinning nozzle;

(2) feeding a second spinning dope solution of a second aromatic imide polymer soluble in organic solvents in a concentration of 1% to 25% by weight in an organic solvent to an outer annular extruding opening formed around and concentrically with the inner annular extruding opening, the concentration of the first aromatic imide polymer in the first spinning dope solution being 0.5% to 10% by weight above the concentration of the second aromatic imide polymer in the second spinning type solution, (3) concurrently extruding the first and second spinning dope solutions through the inner and outer annular extruding openings, respectively, while concurrently drafting the extruded first and second hollow filamentary streams of the first and second spinning dope solutions to allow the first and second hollow filamentary streams to be concentrically united with each other into a double layered hollow filamentary stream; and (4) bringing the double layered hollow filamentary stream into contact with a coagulating liquid to solidify the double layered stream and to form an aromatic polyimide double-layered hollow filamentary membrane, wherein said aromatic polyimide double hollow membrane has an inner layer having a thickness of 10 µm to 500 µm, an intermediate layer having a thickness of 2 µm to 200 µm and a dense outside surface layer having a thickness of no more than 1 µm.

U.S. Pat. No. 4,713,292 relates to a multilayer composite hollow fiber and a method of making same. A multilayer composite hollow fiber comprising at least one nonporous separating membrane layer (A) performing a separating function and two or more porous layers (B) performing a reinforcing function, said layer (A) and said layers (B) being alternately laminated so as to give a structure having inner and outer surfaces formed by said porous layers (B).

JP 62019205 A is related to the preparation of ultrafilter membranes. To prepare a compound film type ultrafilter membrane having a high resistance to delamination and sufficient anti-fouling properties on the necessary part of the surface, at least two kinds of doping liquids are extruded simultaneously. Said doping liquids are transformed to gel by a dry/wet method.

The high molecular porous film is formed of a combination of a high molecular polymer having non-polar groups and a high molecular polymer having polar groups, preferably polysulfone and sulfonated polysulfone. Suitable sulfonated polysulfone is one having 0.5 W1 degree of sulfonation per 1 recurrent unit of polymer. A suitable solvent is one capable of dissolving both polymers to be used being compatible with water used in the gelling bath. Suitable concentration of the doping liquid is 15 to 25 wt.-%. The casting is executed by moving the doping liquid A and B from each adjacent nozzle separated by nozzle walls having different height of the bottom edge to each other.

U.S. Pat. No. 4,802,942 is related to a method of making multilayer composite hollow fibers. According to the method disclosed, a multilayer composite hollow fiber comprises (a) at least one non-porous separating membrane layer which performs a separating function and (b) at least two porous layers which perform a reinforcing function, said layer (A) and said layers (B) being alternately laminated together so as to give a structure having inner and outer surfaces formed by said layers (B) comprises the following steps:

(i) co-spinning a polymer (A') selected from the group consisting of (a) a non-crystalline polymer, (b) a crystalline polymer having a lower melting point than polymer (B'), (c) a crystalline polymer having a melt index greater than the melt index of polymer (B') and (d) a crystalline polymer containing a solvent or plasticizer which forms said separating membrane layer and a crystalline polymer (B') which forms said porous layers through a spinning nozzle of multiple tubular construction which sandwiches the spun polymer (A') between two layers of the spun polymer (B'), thereby forming a composite hollow fiber; and (ii) stretching the resulting hollow fiber thereby imparting porosity to said layers (B) while leaving layer (A) non-porous.

JP 02251232 A relates to a two-layered polyimide hollow yarn membrane and its preparation. To heighten resistance to pressure and gas permeating speed, a hollow yarn membrane is composed with a uniform outer surface layer, an asymmetric outer layer of aromatic polyimide whose fine porous layer is integrally and continuously formed with the outer surface layer and a fine porous inner layer of an aromatic polyimide.

By using a yarn spinning apparatus having a yarn spin nozzle, the concentric circular opening part comprised of an outer circular open part and an inner circular open part and a core open part, a uniform solution of an organic polar solvent containing 1 wt.-% to 25 wt.-% of soluble aromatic polyimide A is supplied to the outer circular open part. Meanwhile, an organic polar solvent solution, containing 5 wt.-% to 35 wt.-% of soluble aromatic polyimide B, is supplied to the inner circular open part and these two polyimide solutions are simultaneously extruded into a two-layer structure hollow yarn. This hollow yarn is brought into contact with a coagulating solution to obtain a two-layered structure hollow yarn membrane.

U.S. Pat. No. 5,620,790 is related to a multi-layer microfiltration membrane having an integrated prefiltration layer and a method of making the same. According to the method disclosed in U.S. Pat. No. 5,620,790 the method of manufacturing a multi-layer unsupported integral microfiltration membrane includes the following steps:

Pouring out a first layer of a solution of polymeric material onto a substrate, subsequently successively pouring out one or more further layers of a solution of polymeric material onto said first layer prior to the occurrence of turbidity of the immediately preceding layer, with the viscosity of each successive layer of a solution of polymeric material being the same as or less than that of the previous layer and finally washing said thus produced membrane and subsequently drying said membrane.

WO 01/89673 A2 relates to a process of forming multi-layered structures. According to the method disclosed an integral multilayered porous membrane is produced by simultaneously co-casting a plurality of polymer solutions onto a support to form a multilayered liquid sheet and immersing the sheet into a liquid coagulation bath to effect phase separation and form a porous membrane. The support can be a temporary support or form an integrated support for the membrane. The plurality of layers may be of the same polymer or different, same concentration or viscosity or different and may be subjected to the same processing conditions or different ones to form unique structures.

According to current production scenarios, an additional step is required after membrane fabrication in that by coating or grafting a new functionality is incorporated onto the membrane surface. According to other methods the bulk membrane material is modified to have enhanced hydrophilic properties before the membrane is fabricated itself. The drawback of such an approach is the fact that membranes having enhanced hydrophilic properties tend to have lower mechanical strength, thus, overall bulk modification will significantly reduce membrane strength.

OBJECT OF THE INVENTION

One object of the present invention is to enhance durability, chlorine resistance and robustness of membranes, particularly for water treatment, such as singlebore membranes or multibore membranes.

A further object of the present invention is to prevent the singlebore membranes or multibore membranes from layer delamination over lifetime. A further object of the present invention is to avoid bulk material modification.

A further object of the present invention is to provide anti-fouling properties on the membrane surface, to create isoporous layers and to use only small amounts of high performance but expensive materials on thin layers.

SUMMARY OF THE INVENTION

According to the present invention a method for fabricating multilayer singlebore membranes or multilayer multibore membranes for an ultrafiltration application is disclosed, including the following method steps:
(a) feeding at least a material of a substrate, at least one material of a functional layer and a bore fluid to a spinneret, simultaneously;
(b) forming said membranes as a tube like string in a one-step extrusion process in the spinneret;
(c) thereby assigning a functionality to said functional layer applied on at least one surface of said substrate.

According to this method a one-step extrusion process is established. Said material of said at least one functional layer is concentrated only in the thin layer forming the functional layer applied to the at least one surface of the substrate, thus a higher efficiency is achieved. Since the material having the functional properties is concentrated only within the thin layer, lower material costs are an advantageous consequence. The method according to the present invention offers the flexibility to tailor the functional layer according to the purposes needed in each application, such as an ultrafiltration application process.

According to an advantageous embodiment of the invention, a functional layer is applied to an inner surface of the substrate, and an additional functional layer is applied to an outer surface of the substrate. Hence, the formed membrane contains three layers, namely a substrate and two functional layers applied on both sides of the substrate.

Furthermore, one or more functional layers can be applied to another functional layer that is applied directly to the surface of the substrate. Hence, the formed membrane contains at least two layers, namely a substrate and a functional layer, but may contain any number of layers whereat said number is greater or equal to two.

Still further, the present invention avoids changing bulk material properties, i.e. modifications of properties of the material of which said substrate is manufactured according to the present invention. Since current approaches for anti-fouling measures come along with several advantages, i.e. anti-fouling additives remain for a certain amount of time in the bulk material or a bulk material modification leads to a general reduction of overall mechanical strength and higher material costs and a surface modification, leads to an undesired reduction of pore size after coating and adjustment processes, the present invention offers a fabrication process which omits the disadvantages listed above coming along with current approaches for anti-fouling purposes, to give an example.

According to a further aspect of the method of the present invention, said tube-like string formed within said spinneret is fed to or guided through a precipitation bath and/or a coagulation bath. In addition to that or alternatively to that, said tube-like string is fed to a water spray that is arranged downstream with respect to said coagulation bath or precipitation bath.

According to the present invention, said material of said substrate includes a first polymer, whereas said material of said functional layer includes a second polymer, said first polymer and said second polymer being different with respect to each other.

A current approach to implementing anti-fouling functionality has been to add an anti-fouling additive, i.e. PESU-b-PEGMA, for instance a hydrophilic additive. These additives may migrate to the surface and allow for the bulk property of the PESU material to remain the same. On the other hand, a certain amount of the hydrophilic additive remains in the bulk material and therefore is ineffective.

A further approach is the bulk material modification, i.e. a sulfonisation of PESU. This can either be established by means of a drop-in solution or a one-step spinning and allows higher packing density of the hydrophilic groups. On the other hand, the bulk material modification comes along with a reduction of overall mechanical strength and in higher material costs.

A still further approach to implement an anti-fouling functionality is the surface modification, for instance a polydopamine coating or polydopamine conditioning of the PESU material. This is considered to be rather effective since this is located only on the membrane surface. On the other hand, the pore size of the material often reduces after coating and needs to be adjusted, which is quite complex, on the other hand the coating should be optimized to avoid deep penetration.

According to a further aspect of the present invention, said functionality of said functional layer is an anti-fouling function as indicated above. By assigning this functionality to said functional layer, fouling is reduced significantly. Fouling constitutes a high-energy consumption factor for filtration. Membrane fouling results from a migration process of parts of the filtration cake into the membrane pores. A fouling process typically comes along with a pore size reduction which is very disadvantageous in particular for ultrafiltration applications, thus the present invention offers a solution to this problem here.

In one embodiment of the present method, said functional layer with respect to anti-fouling function includes PESU-b-PEGMA.

A still further embodiment is to include the functionality of sPPSU.

A still further embodiment of the functional layer includes PS-b-PEGMA.

In an alternative embodiment, said functionality of the functional layer according to the present invention is an isoporous function. One example for this isoporous functionality is S/DPE-b-4-Vpy.

According to a further aspect of the present invention, a spinneret for fabricating multilayer singlebore membranes or multilayer multibore membranes using the method according to the invention is disclosed, said spinneret having at least
  a center part,
  a cone-shaped part and
  a lower part,
wherein each of said parts of said spinneret includes an individual feed. In the case of a multibore spinneret, this spinneret produces additional functional layers via a one-step extrusion process without changing the bulk property of current multibore membranes. The additional functional layer on the substrate has the advantage of providing anti-fouling properties as well as of a pore size control. In the case of a multibore spinneret, the additional step of adding a functional layer onto the multibore membrane is simplified and reduced to just a one-step process. Still further, a multibore spinneret allows for the concentration of the functionality of the functional layer on the membrane's surface.

In particular, individual feeds for every layer of the multilayer membrane are provided.

According to advantageous embodiment of the spinneret according to the present invention, the center part includes a central feed for a bore fluid. Said cone-shaped part of the spinneret according to the present invention includes a second feed for a material of a functional layer, for instance a second polymer. Still further, said lower part of the spinneret according to the present invention includes a first feed for a material of a substrate, for instance a first polymer. The spinneret may have a surrounding part, wherein said surrounding part includes a third feed for a material of an additional functional layer.

In the mounted state, i.e. in the assembled state of the spinneret according to the present invention, an inner funnel section of the spinneret is defined between said center part and said cone-shaped part. To said inner funnel section, said material of said functional layer, for instance a second polymer, can be fed.

On the other hand, the spinneret according to the present invention includes an outer funnel section, which is defined between said cone-shaped part and said lower part, to which said material of said substrate can be fed.

The spinneret according to the present invention may include a surrounding funnel section, which is defined between said lower part and said surrounding part, to which said material of said additional functional layer can be fed.

In the assembled state of the spinneret, said outer part, said cone-shaped part and said lower part and, if present, said surrounding part, form a tube section for said bore fluid.

To allow for an optimization of feeds of the relevant material, said cone-shaped part of the spinneret according to the present invention includes a first annular channel arranged opposite of said first feed, particularly for the first polymer. Still further, said center part of the spinneret includes a second annular channel arranged opposite of said second feed, particularly for the second polymer. By way of this embodiment, the flow characteristics of said first and second polymers, respectively, are taken into account so that an even distribution of said materials, i.e. said first polymer and said second polymer, to the respective inner and outer funnel sections is assured.

According to a further aspect of the present invention, a system for fabricating multilayer single-bore membranes or multilayer multibore membranes using the method according to the invention is disclosed, said system comprising:
  A first material dispensing station,
  a second material dispensing station,
  a third material dispensing station,
  a spinneret according to the invention,
  a precipitation bath and/or a coagulation bath and
  a water spray.

The system according to the present invention, the components of which are listed above, allows for manufacturing said multilayer singlebore membranes or multilayer multibore membranes as a tube-like string-shaped endless cord, which downstream of the outlet of the spinneret either is fed to a precipitation bath or to a coagulation bath, both baths arranged downstream of the outlet of said spinneret.

In the coagulation bath, advantageously a number of deviation elements are arranged, located in transport direction of the tube-like string downstream of said spinneret.

BRIEF DESCRIPTION OF THE DRAWINGS

The subject-matter of the present invention is disclosed in more detail in connection with the accompanying drawings showing:
FIG. 3: a rough process of fabricating a multilayer singlebore membrane.

PREFERRED EMBODIMENTS OF THE PRESENT INVENTION

Figure 1:
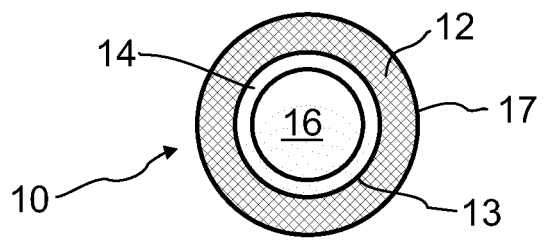
FIG. 1: A multilayer singlebore membrane.

FIG. 1 shows a multilayer singlebore membrane 10.

The multilayer singlebore membrane 10 according to FIG. 1 includes a substrate 12 of annular shape having an inner surface 13 and an outer surface 17. Here, the inner surface 13 is directed towards the center of the annular shape of the substrate 12 and the outer surface 17 is directed to the outside of the annular shape of the substrate 12. Onto the inner surface 13 a material of a functional layer 14 is applied. The functional layer 14 surrounds a bore 16 for a liquid to be treated or filtered.

The singlebore membrane 10 given here contains exactly two layers, namely the substrate 12 and the functional layer 14. But, another functional layer 14 could be applied to the outer surface 17 of the substrate 12. Furthermore, one or more functional layers 14 could be applied to a functional layer 14 that is applied directly to the inner surface 13 or to the outer surface 17 of the substrate 12. Hence, the single-bore membrane 10 could contain for example three, four or more layers.

The material of the substrate 12 is a first polymer such as PESU material providing a mechanical support and being the bulk material. The material of the functional layer 14 adopts an anti-fouling function and/or an isoporous function. According to the present invention, the material of the functional layer 14 is concentrated in a relatively thin layer thickness, so that high efficiency on the one hand and on the other hand lower material costs can be achieved. The material to be chosen to apply a functionality according to the properties of the functional layer gives a high flexibility to tailor the material of the functional layer 14 according to the applications envisaged, for instance ultrafiltration applications. Since the material having the functional properties, i.e. functional layer 14, can be chosen independently from the material for the substrate 12, no change of the bulk material property, i.e. no change of the material for the substrate 12, is necessary.

In FIG. 2, two kinds of multilayer multibore membranes 20 are shown.

Figure 2A:
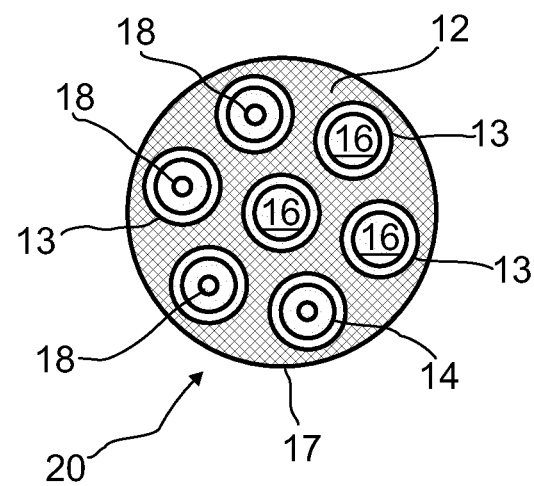
FIG. 2: multilayer multibore membranes.

According to FIG. 2a, the multilayer multibore membrane 20 comprises the substrate 12, i.e. a first polymer, with a circular cross-section having several, presently seven, holes arranged therein. The inner surface 13 of the substrate 12 is the amount of area at the sides of said holes directed towards the centers of said holes. The outer surface 17 of the substrate 12 is directed to the outside of the substrate 12. The multilayer multibore membrane 20 also comprises the material forming the functional layer 14 on the respective inner surface 13 of the material of the substrate 12. The functional layer 14 surrounds several bores 16 for the liquid to be treated or filtered.

The multibore membrane 20 given in FIG. 2a contains exactly two layers, namely the substrate 12 and the functional layer 14. Furthermore, one or more functional layers 14 could be applied to the functional layer 14 that is applied directly to the inner surface 13 of the substrate 12. Hence, the multibore membrane 20 according to FIG. 2a could contain for example three, four, five or more layers.

Figure 2B:
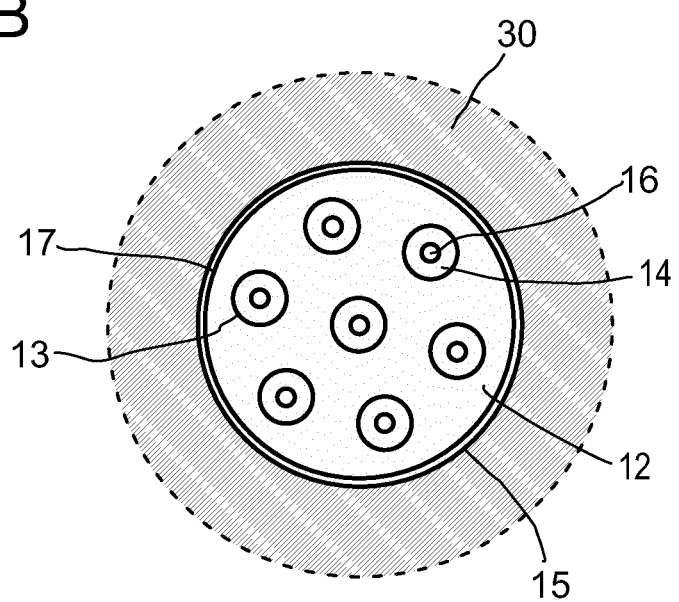

According to FIG. 2b, the multilayer multibore membrane 20 also comprises the substrate 12, i.e. a first polymer, with a circular cross-section having several, presently seven, holes arranged therein. The inner surface 13 of the substrate 12 is the amount of area at the sides of said holes directed towards the centers of said holes. The outer surface 17 of the substrate 12 is directed to the outside of the substrate 12. The multilayer multibore membrane 20 also comprises the material forming the functional layer 14 on the respective inner surface 13 of the material of the substrate 12. The functional layer 14 surrounds several bores 16 for the liquid to be treated or filtered. An additional functional layer 15 is applied to the outer surface 17 of the substrate 12.

The multibore membrane 20 given in FIG. 2b contains exactly three layers, namely the substrate 12, the functional layer 14 and the additional functional layer 15. Furthermore, one or more functional layers 14, 15 could be applied to the functional layer 14 that is applied directly to the inner surface 13 of the substrate 12 or to the additional functional layer 15 that is applied directly to the outer surface 17 of the substrate 12. Hence, the multibore membrane 20 according to FIG. 2b could contain for example three, four, five or more layers.

In FIG. 2b, the multibore membrane 20 is shown immediately after fabricating in a spinneret 30 when emerging the spinneret 30.

In FIGS. 2a and 2b, reference numeral 18 depicts the flow direction of said liquid to be treated; a liquid to be treated may be either sea water or waste water, to give examples.

While the material for substrate 12 is considered to be the bulk material, it usually is a first polymer which offers mechanical support such as for example PESU material.

The material forming the functional layer 14 is a second polymer that may implement an anti-fouling function or an isoporous function or both of them. The material forming the additional functional layer 15 is another polymer that also may implement an anti-fouling function or an isoporous function or both of them. The polymer of the additional functional layer 15 can of the same material as the second polymer of the functional layer 14.

One embodiment of the anti-fouling functionality is given by PESU-b-PEGMA:

Another embodiment may be given by sPPSU:

A still further embodiment of an anti-fouling functionality is given by PS-b-PEGMA:

On the other hand, the functionality coming along with an isoporous function is embodied by S/DPE-b-4-Vpy:

According to FIG. 3, a multilayer singlebore membrane 10 as shown in FIG. 1 is fabricated in a spinneret 30 which is shown here schematically only. According to the schematic view in FIG. 3, said spinneret 30 includes a flow 32 of a first polymer, a flow 34 of a second polymer and a flow 36 of a bore fluid. Said first polymer, said second polymer and said bore fluid are fed to the spinneret 30 substantially simultaneously. At the lower hand of the outlet side of the spinneret 30, a tube-shaped string of a multilayer singlebore membrane 10 is formed. Said tube-shaped string is fed to a precipitation bath 38. In the area of the precipitation bath 38, it can be derived from FIG. 3 that said material of the functional layer 14 has a relatively thin thickness as compared to the thickness of the material of the substrate 12. A bore 16 within the hollow multilayer singlebore membrane 10 is maintained by said bore fluid 36, which is fed to the center portion of the spinneret 30 according to the schematically given view in FIG. 3.

FIG. 3 still further shows a top view of a multilayer singlebore membrane 10. It can be derived from FIG. 3 that the relatively thin material of the functional layer 14 is arranged on the surface 13 of the tube-like shaped material for forming the substrate 12, i.e. the first polymer. The bore 16 allows a flow of liquid to be treated by means of the multilayer singlebore membrane 10 according to the present invention.

Figure 4:
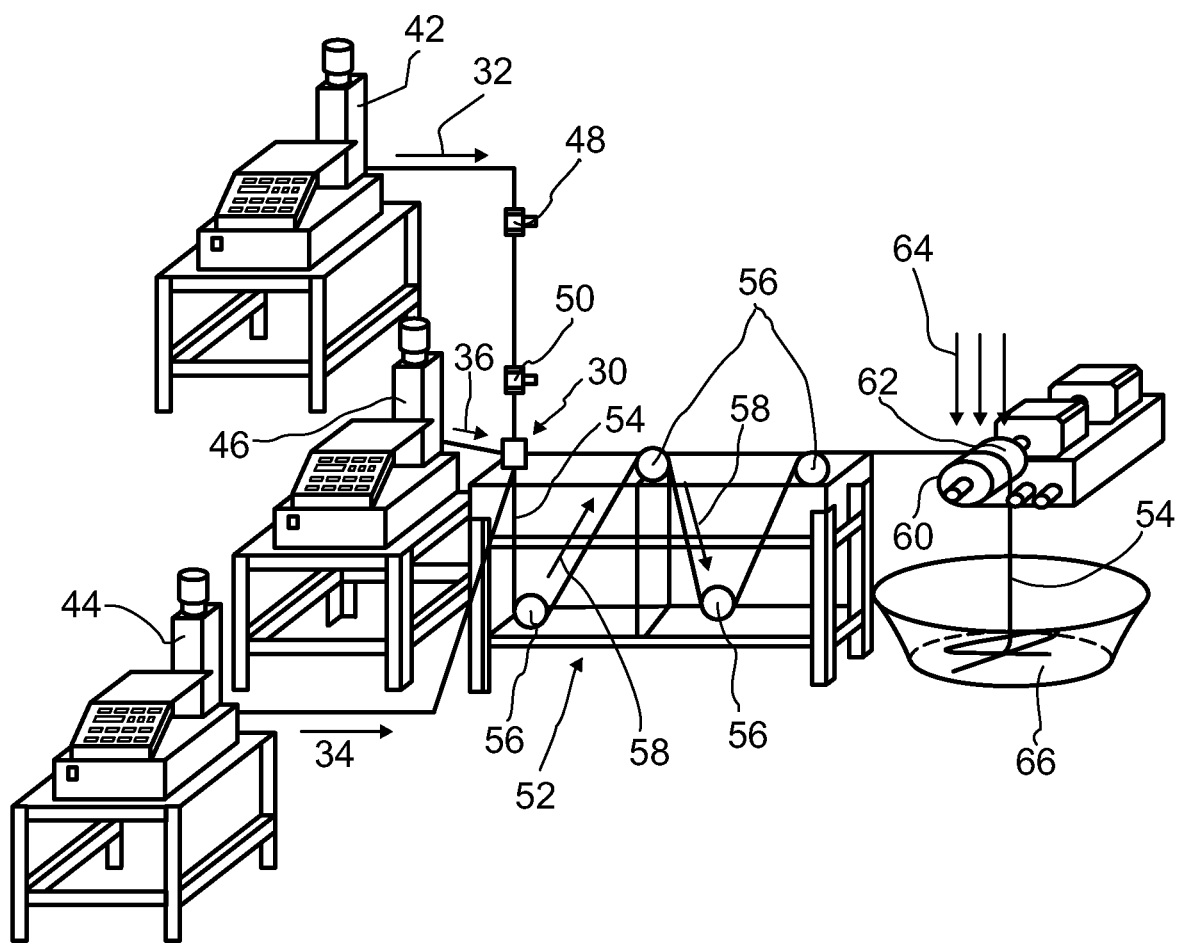
FIG. 4: the components of a system for fabricating multilayer singlebore or multilayer multi-bore membranes.

FIG. 4 shows a system for a larger scale fabrication of either multilayer singlebore membranes 10 or multilayer multibore membranes 20 according to the present invention.

According to FIG. 4, said system comprises a number of components. To start with, said system comprises a first material dispensing station 42 for the material of a substrate 12. The material 12 of a substrate is fed as a flow 32 of the first polymer towards the spinneret 30, particularly a dual-layer forming spinneret 30, as schematically shown in conjunction with FIG. 3.

Said system according to FIG. 4 still further comprises a second material-dispensing station 44 storing the material for forming the functional layer 14. The flow 34 of the second polymer is established from the second material dispensing station 44 to the spinneret 30, i.e. particularly a dual-layer spinneret 30, which is likewise included in the system according to FIG. 4.

Still further, the system according to FIG. 4 comprises a third material dispensing station 46 for the bore fluid.

The flow of the bore fluid 36 is identified in the schematic view of the system according to the present invention in FIG. 4 by reference number 36. All three materials are simultaneously fed to the spinneret 30 arranged in the center of the system according to FIG. 4.

As can be derived from FIG. 4, in the path of flow 32 of the first polymer, a first dosing valve 48 and a second dosing valve 50 are arranged.

At the outlet portion of the spinneret 30 of the system shown in FIG. 4, a tube-like string 54 of a multilayer singlebore membrane 10 is formed. Within a further path of transportation thereof, in transport direction 58, a number of deviation elements 56 are arranged. Said deviation elements 56 are arranged within a coagulation bath 52. By means of the deviation elements 56, the path of the tube-like shaped string 54 of the multilayer singlebore membrane 10 through the coagulation bath 52 is elongated.

Downstream of said coagulation bath 52, seen in transport direction 58 of said tube-shaped string 54 of the multilayer singlebore membrane 10, a water spray 64 is arranged. Said water spray 64 includes a roller 60. On said roller's surface 62 the water spray 64 is applied, for instance in vertical direction as shown in FIG. 4.

Downstream of said water spray 64 a flushing bath 66 is arranged within which the endless tube-like shaped string, i.e. the generated multilayer singlebore membrane 10, is collected.

FIGS. 5, 6, 7 and 8, respectively, show details of a spinneret 30 for fabricating a multilayer multibore membrane 20 as schematically shown in FIG. 2.

Figure 5:
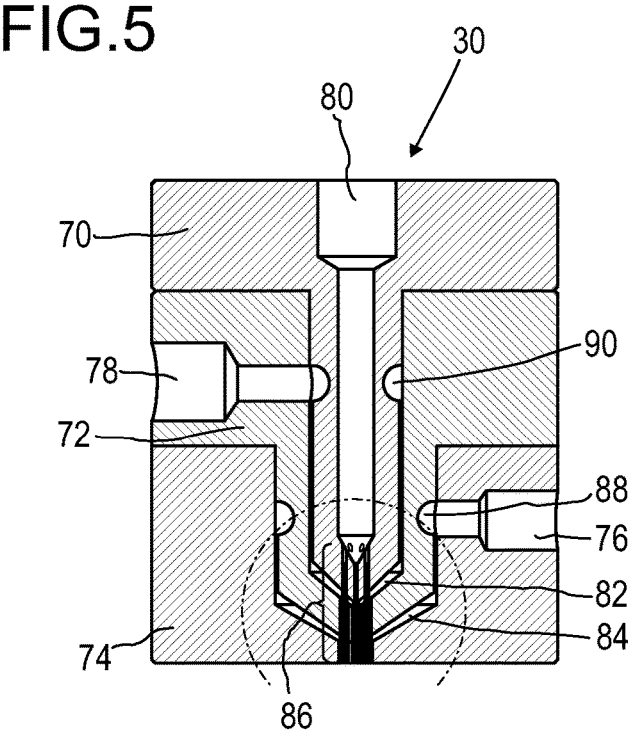
FIG. 5: a cross-sectional view of a spinneret according to the present invention.

FIG. 5 discloses a spinneret 30, particularly a dual-layer spinneret 30. Said spinneret 30 according to the cross-sectional view given in FIG. 5 comprises a center part 70, a cone-shaped part 72 and a lower part 74, respectively. FIG. 5 shows said parts 70, 72, 74 in an assembled state of the spinneret 30. The center part 70 includes a central feed 80 for the bore fluid 36. At the lower end of the central feed 70, a tip-like nozzle arrangement is provided. Said center part 70 of the spinneret 30 is mounted within the cone-shaped part 72 of the spinneret 70. Said cone-shaped part 72 of the spinneret 30 comprises a laterally arranged second feed 78 for the second polymer. As can be derived from the assembly given in FIG. 5, opposite with respect to the second feed 78 for the second polymer, on the corresponding section of the center part 70, a second annular channel 90 is arranged, allowing for transportation of the second polymer to an inner funnel section 82 of said spinneret 30.

Further, according to FIG. 5, said cone-shaped part 72 of the spinneret 30 is mounted within the lower part 74 of the spinneret 30. The lower part 74 comprises a first feed 76, likewise extending in lateral direction with respect to the center axis of the spinneret 30 shown in the cross-sectional view according to FIG. 5. Opposite with respect to the first feed 76 for the first polymer, said cone-shaped part 72 of the spinneret 30 comprises a first annular channel 88, allowing for transportation of the first polymer to an outer funnel section 84 of said spinneret 30.

The spinneret 30 shown here allows fabricating membranes 10, 20 with two layers, namely with a substrate 12 and with a functional layer 14. A spinneret 30 for fabricating membranes 10, 20 with more than two layers is also feasible. Such a spinneret 30 for fabricating membranes 10, 20 with more than two layers has individual feeds for every layer of the multilayer membrane to be formed.

According to the cross-sectional view according to FIG. 5, the inner funnel section 82 is defined between the outer contour of the center part 70 of the spinneret 30 on the one hand and on the other hand by the inner contour of said cone-shaped part 72 of the spinneret 30. The inner funnel section 82 is fed from the second annular channel 90, which in turn is in connection with the second feed 78 for the second polymer. Thus, a flow of the second polymer from the second feed 78 to the inner funnel section 82 within the spinneret 30 is established.

Between the outer contour of the cone-shaped part 72 and the inner contour of the lower part 74 of the spinneret 30, the outer funnel section 84 is defined. Said outer funnel section 84 is fed from the first annular channel 88, which is in connection with the first feed 76 for the first polymer. Thus, the outer funnel section 84 is fed with the first polymer, i.e. the material of a substrate 12.

Figure 9:
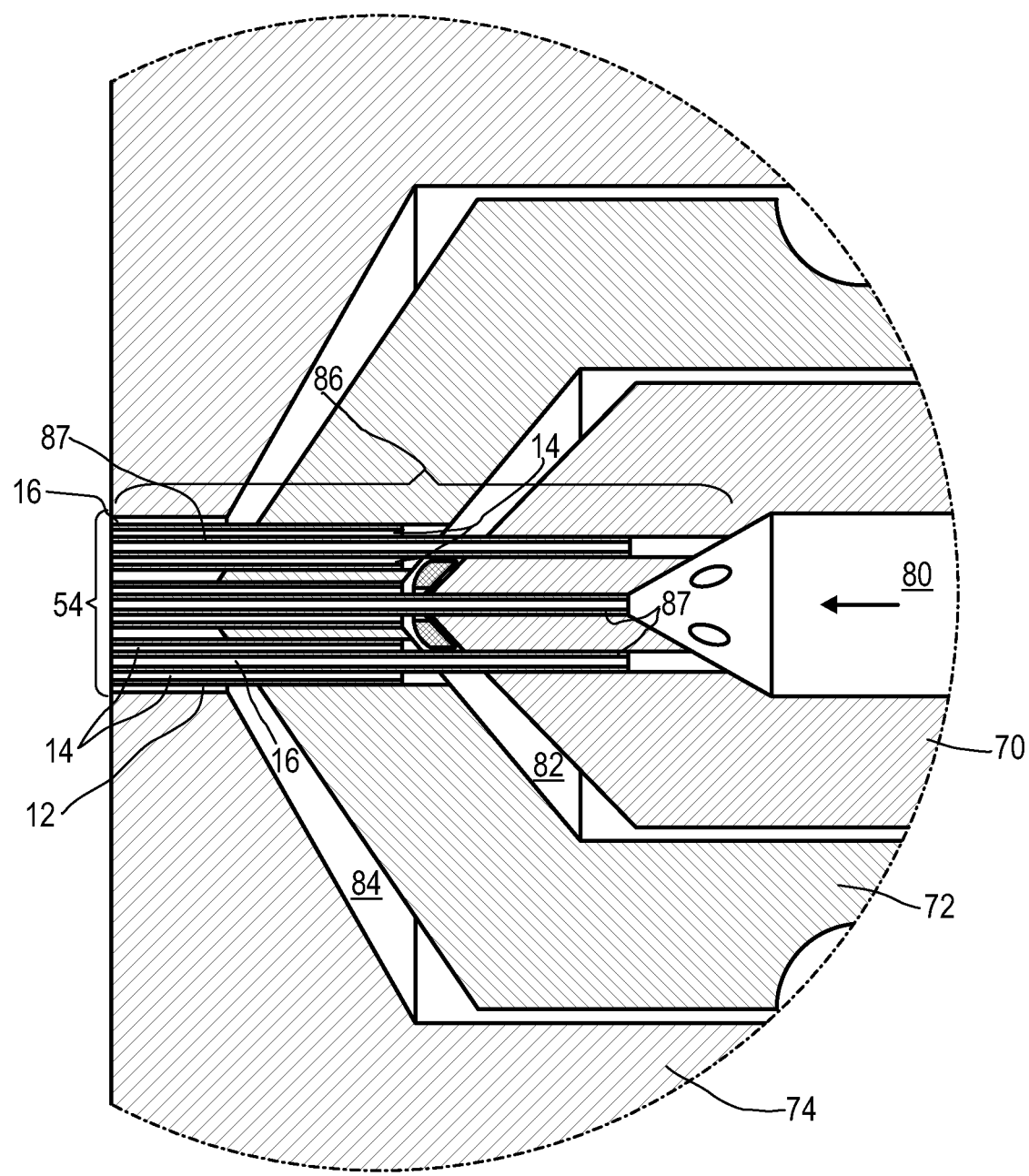

As can be derived from FIG. 5, however better shown in an enlarged view according to FIG. 9, said spinneret 30 given in FIG. 5 comprises a tube section 86. Said tube section 86 includes a number of single tubes 87 as best shown in an enlarged view according to FIG. 9. Said single tubes 87 form the bores 16, i.e. hollow spaces, within which the liquid to be treated, for instance sea water or waste water, flows through the multilayer multibore membrane 20, see FIG. 2, as fabricated with the spinneret 30, the cross-sectional view of which is given in FIG. 5.

Figure 6:
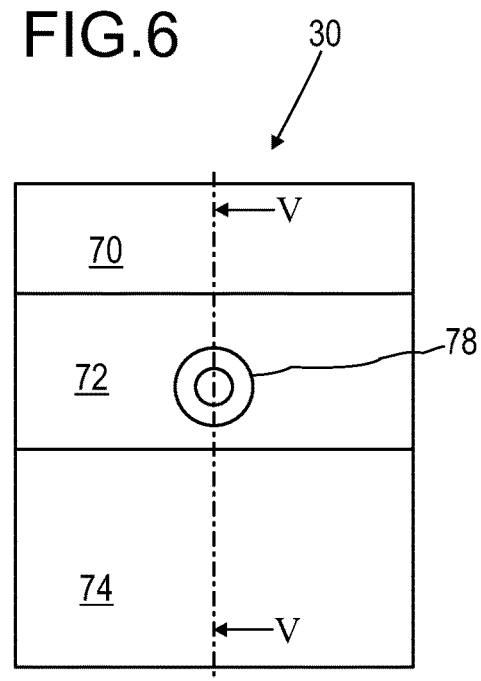
FIG. 6: a side view of said spinneret according to FIG. 5,
  FIG. 7: a view at the lower side of the spinneret according to FIG. 5,
  FIG. 8: a detail of the outlet opening of the lower side of the spinneret according to FIG. 7,
  FIG. 9: a sectional view of said spinneret showing the inner and outer funnel sections in greater detail.

FIG. 6 shows the spinneret 30 in a side view.

According to the side view given in FIG. 6, the spinneret 30 comprises the center part 70, mounted in the cone-shaped part 72, having the second feed 78 for the second polymer, being the material forming the functional layer 14 and the lower part 74. The cross-sectional view shown in FIG. 5 is indicated in the side view according to FIG. 6 by intersection line V-V.

Figure 7:
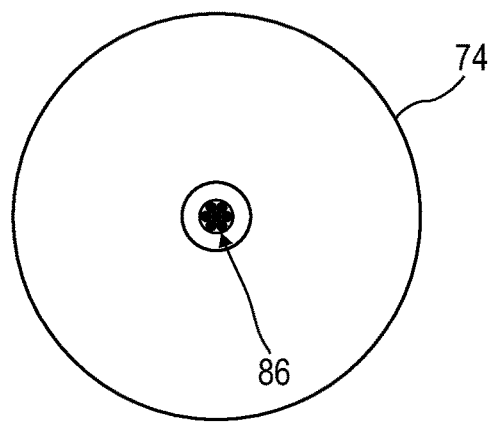

FIG. 7 shows the lower end of the spinneret 30 according to FIG. 5.

In the center portion of the lower part 74, the pattern of the multibore arrangement of the multi-layer multibore membrane 20 according to FIG. 2 can be seen. This detail is shown in an enlarged view according to FIG. 8, which shows the tube section 86 having a number of single tubes 87 ending at the lower side of the lower part 74 of the spinneret 30.

FIG. 9 shows the lower section of the spinneret 30, the cross-sectional view of which is given in FIG. 5, in a greater scale.

According to the cross-sectional view given in FIG. 9, it is disclosed that the inner funnel section 82 is fed with the second polymer, induced by the second feed 78.

The single tubes 87 forming the tube section 86 extend to the inner funnel section 82, defined between the center part 70 and the cone-shaped part 72 of the spinneret 30.

The outer funnel section 84 established between the cone-shaped part 72 of the spinneret 30 and the inner contour of the lower part 74 of the spinneret 30 is fed through a gap vertically extending from the first feed 76 as best shown in the cross-sectional view according to FIG. 5 of the spinneret 30. Likewise, said single tubes 87 of the tube section 86 extend to the outer funnel section 84 as well.

Thus, downstream of the outer funnel section 84 the tube-like string 54 of the multilayer multi-bore membrane 20 is formed in an endless manner by continuously feeding the first polymer to the first feed 76, the second polymer to the second feed 78 and the bore fluid 36 to the central feed 80 arranged in the center part 70 of the spinneret 30.

Figure 8:
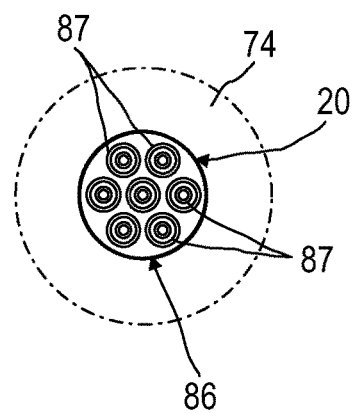

As can be derived from the enlarged view in FIG. 8, this pattern of tubes 87 corresponds to the pattern of bores 16 given in FIG. 2, showing the multilayer multibore membrane 20, fabricated by the dual-layer multibore spinneret 30 schematically shown in the cross-sectional view according to FIG. 5 and in larger detail in the cross-sectional view according to FIG. 9.

As can be derived from FIG. 9, the tube-shaped string 54 fabricated within the dual-layer multibore spinneret 30 comprises a number of bores 16, encapsulated by the material of the functional layer 14 which in turn is surrounded by the material of the substrate 12.

Figure 10:
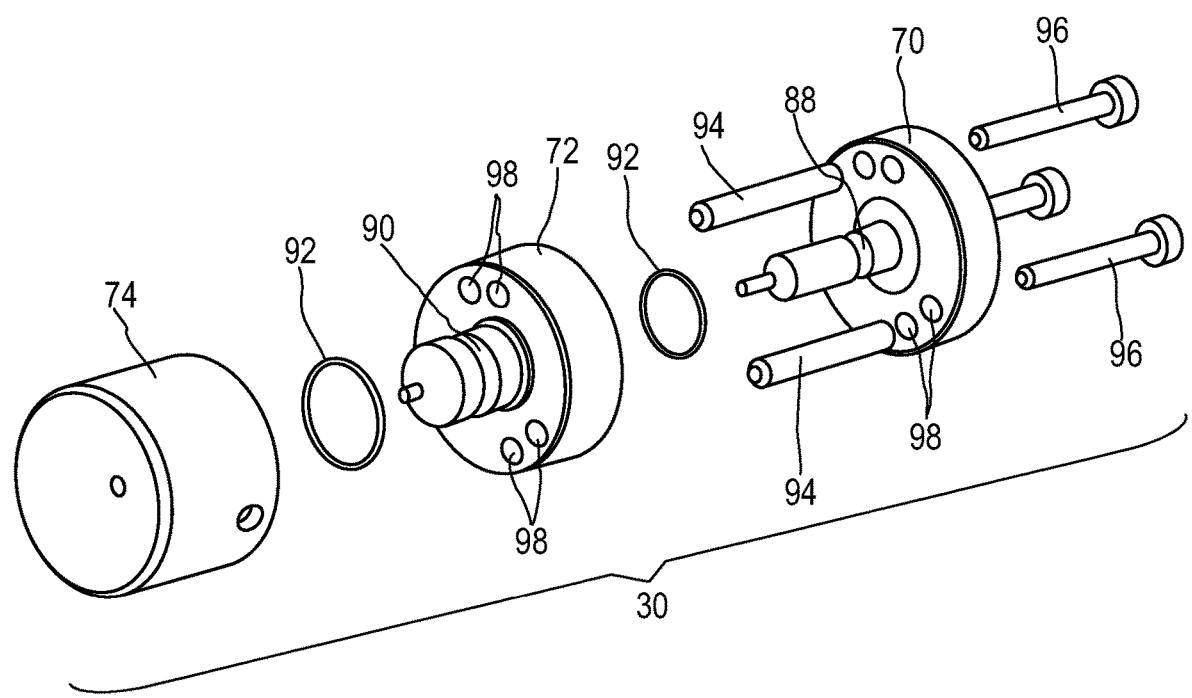
FIG. 10: an exploded view of the components of the spinneret when separated from one another.

FIG. 10 shows an exploded view of the components of the spinneret, in this case a dual-layer spinneret.

As best shown in the exploded view according to FIG. 10, the spinneret 30 comprises the lower part 74, the cone-shaped part 72 as well as the center part 70. Between the cone-shaped part 72 and the lower part 74, a ring-shaped sealing element 92 is arranged. A further sealing element 92 is arranged between the cone-shaped part 72 and the center part 70 of the spinneret 30 according to the exploded view in FIG. 10. The parts 70, 72, 74 are centered with respect to each other by at least one centering rod 94. Fastening elements 96 extend through openings 98 of the center part 70 and the cone-shaped part 72, respectively, cooperating with corresponding threads in lower part 74, although not shown here.

It can be derived from FIG. 10 that the cone-shaped part 72 comprises the second annular channel 90 cooperating with the second feed 78 according to the cross-sectional view given in FIG. 5, whereas the first annular channel 88 of the lower part 74 corresponds with the first feed 76 for the first polymer.

REFERENCE NUMERAL LIST 10 multilayer singlebore membrane
12 substrate (support) (polymer 1)
13 inner surface (of 12)
14 functional layer (polymer 2)
15 additional functional layer
16 bore (free cross-section)
17 outer surface (of 12)
18 flow direction
20 multilayer multibore membrane
30 spinneret (dual-layer)
32 flow of polymer 1
34 flow of polymer 2
36 bore fluid (third material)
38 precipitation bath
40 functional material (hydrophilic, isoporous properties)
42 first material dispensing station (substrate 12)
44 second material dispensing station (functional layer 14)
46 third material dispensing station (bore fluid 36)
48 first dosing valve
50 second dosing valve
52 coagulation bath
54 tube-like string
56 deviation elements
58 transport direction
60 roller
62 roller surface
64 water spray
66 flushing bath
70 center part (of spinneret)
72 cone-shaped part (of spinneret)
74 lower part (of spinneret)
76 first feed (of 74 for 12/polymer 1)
78 second feed (of 72 for 14/polymer 2)
80 central feed (of 70 for third material bore fluid 36)
82 inner funnel section (for 14)
84 outer funnel section (for 12)
86 tube section (for 36)
87 single tube
88 first annular channel (of 72)
90 second annular channel (of 70)
92 sealing element
94 centering rod
96 fastening elements
98 through-openings
1 V intersection line

The invention claimed is:

1. A method for fabricating multilayer multibore membranes, the method comprising the following:
   (a) feeding at least a material of a substrate, a material of a first functional layer, a material of a second functional layer which is different from the material of the first functional layer and a bore fluid to a spinneret simultaneously;
   (b) forming said multilayer multibore membranes as a tube-like string in a one-step process in said spinneret; and
   (c) thereby assigning functionality to said first and second functional layers,
   wherein said first functional layer is applied to an inner surface of said substrate, and said second functional layer is applied to an outer surface of said substrate, whereat said first functional layer surrounds several bores; and wherein said material of said substrate comprises a first polymer, said material of said first functional layer comprises a second polymer, and said material of said second functional layer comprises a third polymer; said first, second and third polymers being different with respect to each other.

2. The method of claim 1, wherein said tube-like string is guided through a precipitation bath and/or a coagulation bath.

3. The method of claim 2, wherein said tube-like string is fed to a water spray arranged downstream with respect to said precipitation bath and/or said coagulation bath.

4. The method of claim 1, wherein said functionality of said first functional layer and said second functional layer is an anti-fouling function and/or an isoporous function.

* * * * *